May 24, 1932.  W. W. NICKELS  1,859,787
AUTOMOBILE ATTACHMENT
Filed Aug. 10, 1931   2 Sheets-Sheet 1
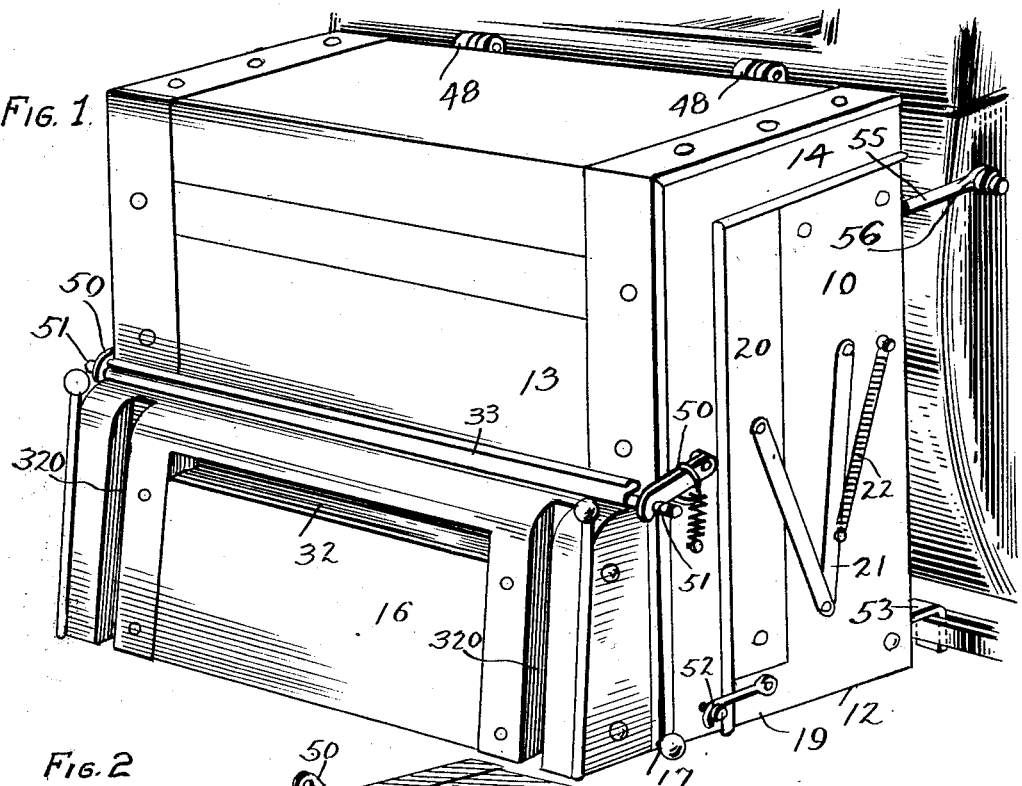
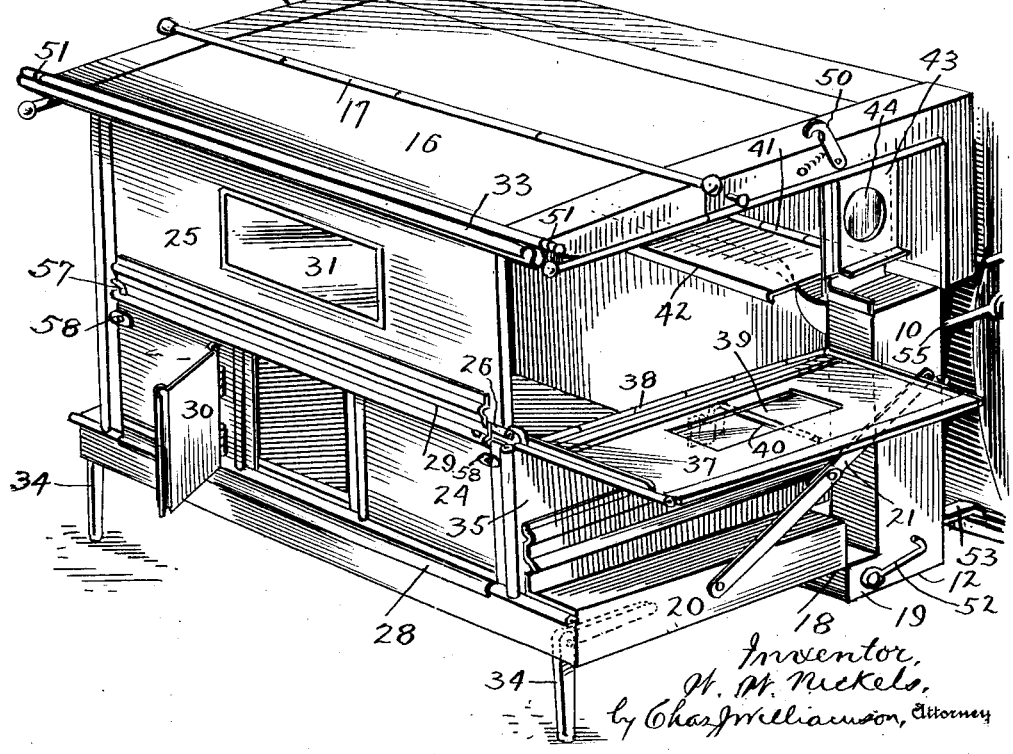

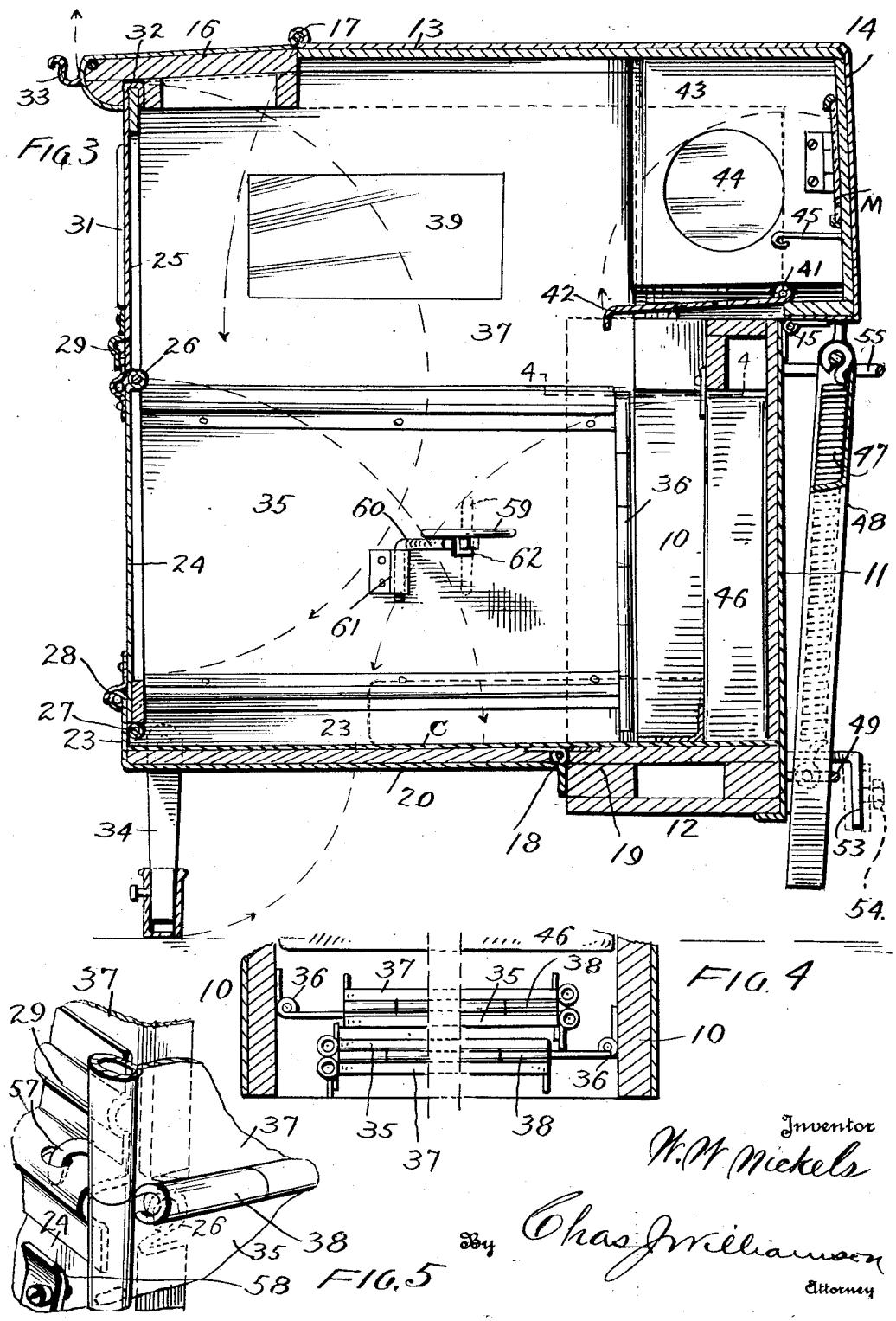

Patented May 24, 1932

1,859,787

UNITED STATES PATENT OFFICE

WILLIAM W. NICKELS, OF BRISTOL, VIRGINIA, ASSIGNOR OF ONE-HALF TO WILLIAM A. DISHNER, OF BRISTOL, VIRGINIA

AUTOMOBILE ATTACHMENT

Application filed August 10, 1931. Serial No. 556,241.

For a variety of reasons or purposes, it is very desirable that an automobile of ordinary construction be supplemented with a shelter in the form of a room or enclosure available for use for which the normal automobile body is not suitable nor fitted. Sometimes to meet this need a trailer is provided. This and other contrivances known to me for a similar purpose are objectionable or undesirable for one reason or another. It is desirable with such an attachment to avoid any alteration or modification of the normal or ordinary automobile especially in regard to the body and to avoid any striking alteration in the normal appearance of an ordinary automobile when it is supplemented by a room or shelter or to objectionably add to the bulk of the automobile when run or operated without making use of the room or shelter as such.

It is also desirable that my supplemental room or shelter shall be in the form of an attachment complete in itself so that when it is desired to operate or run the automobile and make use of the ordinary normal body accommodations, the attachment may be left off altogether and left, for example, in the garage.

The object of my invention is to provide a supplemental room or shelter having all required space for an occupant standing or lying down and capable of being put to such uses as a bedroom or sleeping place or as a store or stand for exhibiting or displaying and selling articles of merchandise while the vendor or seller is within the room or shelter and to do all this by a construction having floor, walls and other members that may be folded into such compact space that no more room or space at the rear of the automobile body will be occupied than in the case of a fairly large automobile trunk; and so that it may be in the form of a readily attachable and detachable structure.

My invention consists in whatever is described by or is included within the terms or scope of the appended claims.

In the drawings:—

Fig. 1 is a perspective view showing an embodiment of my invention in its closed or compacted form mounted at the rear of an automobile in the place usually occupied by an automobile trunk, the opened out position to provide a room of substantial size being generally indicated by dotted lines;

Fig. 2 is a perspective view showing the floor, walls, roof and other parts opened out to constitute or provide a room or shelter, the upper parts of opposite side walls being shown opened out in horizontal table-forming position;

Fig. 3 is a vertical section with the parts in the position shown in Fig. 2;

Fig. 4 is a horizontal section on the line 4—4 of Fig. 3, with the side walls in closed position.

Fig. 5 is a detail view in perspective of adjacent portions of the end and side walls.

As will be seen by reference to Fig. 1, the structure embodying my invention presents when folded the general dimensions and external appearance of an automobile trunk, and this is due to the fact that I provide as the foundation of the structure what for convenience I will term the trunk or storage member in the form of a vertically elongated or oblong box that comprises two vertical end walls, 10, spaced apart the width of the automobile preferably from fender to fender a forward vertical wall, 11, a bottom, 12 (all these parts being fixed or stationary) and a wall, 13, and a top wall, 14 joined together so as to have an L-shape as one member and which is hinged by a hinge, 15, to the upper forward corner of the box so that it may be swung through 90° from the closed position shown in Fig. 1 to the open position shown in Fig. 2. When in the open position shown in Fig. 2, the wall, 14, extends vertically and supports the wall, 13, horizontally so that it extends rearward and provides the roof of the room or compartment at a height which for convenience may be six feet although the height of the end walls, 10, may be but four feet.

The wall 13, has at the end opposite the wall 14, a section, 16, which by a hinge, 17, at one corner may be made to occupy the collapsed position shown in Fig. 1, flat against the outer side of the wall, 13 or a position in line with the main portion of the wall, 13, so as to constitute a horizontal extension of the roof of the room or compartment.

Pivoted by a transversely extending hinge 18 at its edge to the rear upper edge of a ledge or rearward extension, 19, from the end walls, 10, and extending from side to side thereof is a section 20, which when the device is folded or collapsed as shown in Fig. 1 fills the space between the rear side of the end walls, 10, and the vertical wall 13, while when opened out said section 20 is made to occupy the horizontal position shown in Fig. 2 where it constitutes a floor section being a rearward extension of the bottom or floor 12. Said section 20 is supported in horizontal floor-forming position by a jointed brace 21, which preferably is normally under the pull of a tension spring 22, that automatically closes up the jointed brace in the mere act of swinging the floor section 20 from the floor forming to the vertical storage position.

The floor section 20 has at each side and the outer end a flange or ledge 23, which makes of the floor section an enclosure for two wall sections 24 and 25 that are hinged on a horizontal hinge 26, to one another so that they may be collapsed or folded flat against one another and placed in the enclosure formed by the floor flanges or sills and so that they may be opened out into alinement to constitute as shown in Fig. 2 the rear or back wall of the room or chamber. The section 24 is hinged at one edge by a hinge 27, adjacent the rear sill or flange of the floor, against the inner side of which is bears when the two wall-sections are swung to a vertical position and thereby that wall is braced or supported. A flange or flashing 28 on the wall section 24 adjacent the top edge of the floor rear flange or sill covers the joint between them when the wall is in its vertical position and thus prevents water entering the joint between them and sheds it to the ground. And a similar overlapping weather strip arrangement 29, safeguards from rain the joint where the two sections 24 and 25 are hinged together.

In what is the lower section 24 when the sections are arranged to constitute a vertical wall, is a hinged door 30 to enable one to enter the compartment or to leave it. And in what is the upper section 25 is a window 31.

The top edge of the upper section 25 when in a vertical postion enters and interlocks with a slot 32 in the roof extension and thereby roof and rear walls are rigidly engaged and all required stability of the structure as to those parts is obtained. The roof section 16 projects beyond the rear wall and preferably a gutter 33 is provided to carry off water that by the inclination of the upper surface of said roof section is shed to the gutter.

To support the floor 28 at the far or outer end when in the opened position, I pivot to what is then the underside thereof near each side a leg 34, which as the floor section is swung down automatically move into ground engaging position and when the floor section is swung upward to a vertical position automatically move to and lie against the outer side of the floor section out of the way. Preferably said legs 34 are longitudinally extensible as by being made of sliding or telescopic sections in order to enable each to be adjusted to suit inequalities in ground levels when the room or chamber is opened out.

Side walls are provided each of which consists of two similar sections hinged to one another so that they may be folded to lie one section against the other or opened out to aline with one another to make a closed wall extending from floor to roof and both sections being hinged on a vertical pivot or hinge to one of the box sides, 10 so that each pair of wall sections may be swung from a space within the box to a position alining with and forming a rearward extension of each side wall 10 of the box.

Each of said side walls consists of a lower section 35 secured by a hinge 36, at one edge to the inside of an end wall 10 and a substantially similar section 37 which by a hinge 38 is pivoted to the top edge of the section 35, and which when folded over the bottom section 35, lies on the outer side thereof. The hinge 36 of one side wall is positioned in a vertical plane to one side of the hinge 36 of the other side wall so that when the two side wall sections are swung into the space between the ends 10, one will lie flat against the other and both folded side walls will be wholly within the limits of said end walls 10 of the storage box or trunk.

Preferably the section 37 of each side wall has a window 39; and flashings or weather strips are applied at proper points to prevent entrance of rain or snow into the compartment when the side walls are in position for use. When opened vertically, the upper edge of the section 37 enters a slot 320 in the top section 16.

When it is desired to use the room or compartment for display and sale of goods, the top sections 37 of the side walls may be swung outward in a horizontal position and to support them in such position, an arm 40, is pivoted to the outer side of the lower section 35, just below the hinge 38, which arm may be swung from a position flat against the side wall section to a position at right angles where it will support the outturned section 37 in a horizontal position. The seller or vendor must thus stand within the room or compartment and make use of the downturned sections 37 as counters and by turning the section 25 of the rear wall downward on the inside of the lower section 24, the room will open out at the back and upon both sides and a number of persons may gather on all three sides.

Hinged at one edge by a horizontal hinge 41, within the section 14, is a plate or board 42, which when the section 14 is opened out as shown in Fig. 2, may be swung to a horizontal position to rest upon the top of the box or trunk member, 11, so as to serve as a shelf or table and situated behind said plate or board when in its folded position are two similar side wall sections 43, of a size to close the side wall space between the member, 14, and the side wall section 37, when in a raised position, and each of said sections 43 is hinged at one edge so that it may be swung into such space or back within the space in rear of the table-forming plate or board 43. Each of said sections 43 may have a circular window 44, and between said sections a mirror M or looking glass, is secured to the inside of the member or section, 14, above the downturned plate 43 when it forms a table or dresser. A simple rotatable latch 45, is provided to hold the plate or table 43 in its folded position.

For sleeping purposes a pallet or bed 46, is hinged to the back wall of the box or trunk section, 11, close to the floor, 20 and may be swung out to rest upon the floor when it is to be used as a bed. Preferably the floor is covered with carpet C or linoleum or other suitable material which extends over the hinged joint of the floor into the bottom of the box or trunk, 10, so as to cover the joint due to the hinge.

To counterbalance the weight of the parts 13 and 14 and what is carried by them so as to render the upward swinging thereof into roof and front wall forming position and to hold or to aid in holding them in that position, I connect one or more coil springs thereto which normally tend to swing said parts from the closed position shown in Fig. 1 to the opened position shown in Fig. 2. I show in the drawings two coil springs 47 that extend vertically in front of the front wall of the box or trunk and at the lower end are secured to such wall and at the upper end are connected to the member, 14, and preferably each such spring for protection and appearance sake is covered by a sheet metal shield or sheath 48, which is pivoted at the upper end to the member 14, and is guided by a loop 49, near the bottom in its vertical movements. There is sufficient room beneath the lower ends of said shields or covers and the ground so that the lower ends of the covers do not in their descending movement reach to the ground.

When the roof section 16 is folded to the position shown in Fig. 1, it is there secured by a latch 50, which may be a spring held latch pivoted to the member, 13, and engaging a stud 51, on the section, 16. Such a latch device is provided at each end. And a similar latch device 52, is provided at each side near the bottom to hold the sections 13 and 14 and their attached parts in a closed position, shown in Fig. 1.

For the mounting of my invention upon the rear of the ordinary automobile body, all that is necessary is to engage with the rear bumper of the automobile a hook or clip 53, and to secure it by a clamp bolt or screw 54 at each side of the automobile and the clip being at the bottom, it utilizes the bumper as a bottom support and near the top a forwardly projecting arm 55, is attached near each side of the box or trunk and at its forward end has a hole for a clamp bolt 56, secured to and projecting from the side of the automobile body.

I have been careful to so proportion the dimensions of my attachment that even though when opened out a room or compartment of substantial size is provided, the top when the parts are closed does not reach above the window in the rear wall of the automobile body and as has been before stated, the rearward projection beyond the back of the automobile body is not considerable enough to spoil the appearance of the automobile nor to constitute an objectionable bulk at the back.

At suitable points where parts overlap or adjoin interlocking hook devices 57 and turn buttons 58, may be employed or provided as shown in the drawings to add to the security and the rigidity of the structure especially when it is opened out to form the room.

A seat, 59 (see Fig. 3) may be provided that is supported from one of the side wall sections 35, by an arm 60 which has a vertical extension pivoted in an eye, 61, secured to the side wall section, 35, so that the seat may be swung into and out of position for use. The seat has on its underside a square socket, 62, that fits over the square end of the arm, 60, so that it may be placed either in the horizontal position shown in full lines in Fig. 3 or in the vertical position shown in dotted lines to enable it to be folded flat against the side wall section 35.

Any desired material, sheet metal or otherwise may be used in constructing the walls and other parts, materials being used, of course, of the minimum weight consistent with strength.

Of course, I do not confine myself only to the particular construction and relative arrangement of parts shown in the drawings and described in detail in the specification, as many changes may be made in all these respects which will involve no departure from the scope of my invention.

What I claim is:—

1. An automobile attachment for providing a room or chamber comprising a box-like or container member having permanent vertical walls and a floor, a roof-forming and rear wall forming member hinged at one point to the top of said container and forming a closure for otherwise open sides of said container and wall-forming members each of hinged sections and each hinged to end walls of said container for movement into and out of the same the roof forming and rear wall forming member being placed in a position as the roof of the room when in the open position and then the wall forming members that are hinged to the end walls of the container being moved to position closing the ends of the room.

2. An automobile attachment for providing a room or chamber comprising a box-like or container member having permanent vertical walls and a floor, a roof-forming and rear wall forming member hinged at one point to the top of said container and forming a closure for otherwise open sides of said container and wall-forming members each of hinged sections and each hinged to end walls of said container for movement into and out of the same the roof forming and rear wall forming member being placed in a position as the roof of the room when in the open position and then the wall forming members that are hinged to the end walls of the container being moved to position closing the ends of the room, and a floor-forming member hinged to said container at the bottom and movable from a vertical to a horizontal position at the rear of said container.

3. An automobile attachment for providing a room or chamber comprising a box-like or container member having permanent vertical walls and a floor, a roof-forming and rear wall forming member hinged at one point to the top of said container and forming a closure for otherwise open sides of said container and wall-forming members each of hinged sections and each hinged to end walls of said container for movement into and out of the same the roof forming and rear wall forming member being placed in a position as the roof of the room when in the open position and then the wall forming members that are hinged to the end walls of the container being moved to position closing the ends of the room, a floor-forming member hinged to said container at the bottom and movable from a vertical to a horizontal position at the rear of said container, and a wall of hinged sections one of which is hinged to said floor.

4. An automobile attachment for providing a room or chamber comprising a box-like or container member having permanent vertical walls and a floor, a roof-forming and rear wall forming member hinged at one point to the top of said container and forming a closure for otherwise open sides of said container and wall-forming members each of hinged sections and each hinged to end walls of said container for movement into and out of the same the roof forming and rear wall forming member being placed in a position as the roof of the room when in the open position and then the wall forming members that are hinged to the end walls of the container being moved to position closing the ends of the room, and counterbalancing means for said roof and end wall members.

5. An automobile attachment for providing a room or chamber comprising a box-like or container member having permanent vertical walls and a floor, a roof-forming and rear wall forming member hinged at one point to the top of said container and forming a closure for otherwise open sides of said container and wall-forming members each of hinged sections and each hinged to end walls of said container for movement into and out of the same the roof forming and rear wall forming member being placed in a position as the roof of the room when in the open position and then the wall forming members that are hinged to the end walls of the container being moved to position closing the ends of the room, said roof-forming member including a hinge section to form a roof extension.

6. An automobile attachment for providing a room or chamber comprising a box-like or container member having permanent vertical walls and a floor, a container closure and roof-forming member hinged to the top of said container member to swing upward and downward and which is hinged to open to a position to form the roof of the room and means to counterbalance the same.

7. An automobile attachment for providing a room or chamber comprising a box-like or container member having permanent vertical walls and a floor, a container closure and roof-forming member hinged to the top of said container member to swing upward and downward and which is hinged to open to a position to form the roof of the room, and means to counterbalance the same, said roof and closure member being L-shape.

In testimony whereof I hereunto affix my signature.

WILLIAM W. NICKELS.